(12) United States Patent
Lerner et al.

(10) Patent No.: US 6,782,136 B1
(45) Date of Patent: Aug. 24, 2004

(54) METHOD AND APPARATUS FOR ENCODING AND DECODING SUBBAND DECOMPOSITIONS OF SIGNALS

(75) Inventors: Bao T. Lerner, Bowie, MD (US); John F. Pierce, Silver Spring, MD (US); Robert W. Buccigrossi, Palmyra, PA (US)

(73) Assignee: KT-Tech, Inc., Bowie, MD (US)

( * ) Notice: Subject to any disclaimer, the term of this patent is extended or adjusted under 35 U.S.C. 154(b) by 609 days.

(21) Appl. No.: 09/833,803

(22) Filed: Apr. 12, 2001

(51) Int. Cl.[7] ............................ G06K 9/36; G06K 9/46
(52) U.S. Cl. ........................... 382/240; 382/251
(58) Field of Search ............................ 382/232, 240, 382/239, 251, 244–248; 375/240.11, 240.19; 341/65, 79

(56) References Cited

U.S. PATENT DOCUMENTS 5,321,776 A  *  6/1994  Shapiro ...................... 382/240
6,600,838 B2 *  7/2003  Chui ........................... 382/249
2002/0080408 A1 *  6/2002  Budge et al. ............. 358/261.2

OTHER PUBLICATIONS

Said et al., Image Compression Using the Spatial–Orientation Tree, May 3–6, 1993, Circuits and Systems, 1993., ISCAS '93, 1993 IEEE International Symposium on, vol. 1, pp. 279–282.*

* cited by examiner

*Primary Examiner*—Timothy M. Johnson
(74) *Attorney, Agent, or Firm*—Ernest J. Beffel, Jr.; Haynes Beffel & Wolfeld LLP (57) ABSTRACT

An aspect of the present invention includes a method of encoding coefficients of a subband decomposition, to prepare the coefficients for compression. Another aspect of the present invention includes an inverse method of decoding coefficients of a subband decomposition, after they have been decompressed. Particular features and other aspects of the present invention are indicated in the specification, including the drawings and claims.

76 Claims, 9 Drawing Sheets

METHOD AND APPARATUS FOR ENCODING AND DECODING SUBBAND DECOMPOSITIONS OF SIGNALS

BACKGROUND OF THE INVENTION

Subband decompositions efficiently represent a wide range of signals in forms suitable for compression. The encoded representations of these decompositions may be lossless or lossey. The efficiency of compression depends on reordering and transforming the representation of coefficients, which may decrease the number of bits to be compressed and should organize the bits to be compressed in an order that enhances the effect of compression. One subband decomposition that has become favored is a discrete wavelet transform. Work has been done, but much remains to be done on efficiently transforming a subband decomposition to prepare it for compression.

Therefore, there is an opportunity for inventions which prepare subband decompositions for compression, which include both methods and inverse methods of operating on decompositions and data structures well adapted to preparing subband decompositions for compression.

SUMMARY OF THE INVENTION

An aspect of the present invention includes a method of encoding coefficients of a subband decomposition, to prepare the coefficients for compression. Another aspect of the present invention includes an inverse method of decoding coefficients of a subband decomposition, after they have been decompressed. Particular features and other aspects of the present invention are indicated in the specification, including the drawings and claims.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
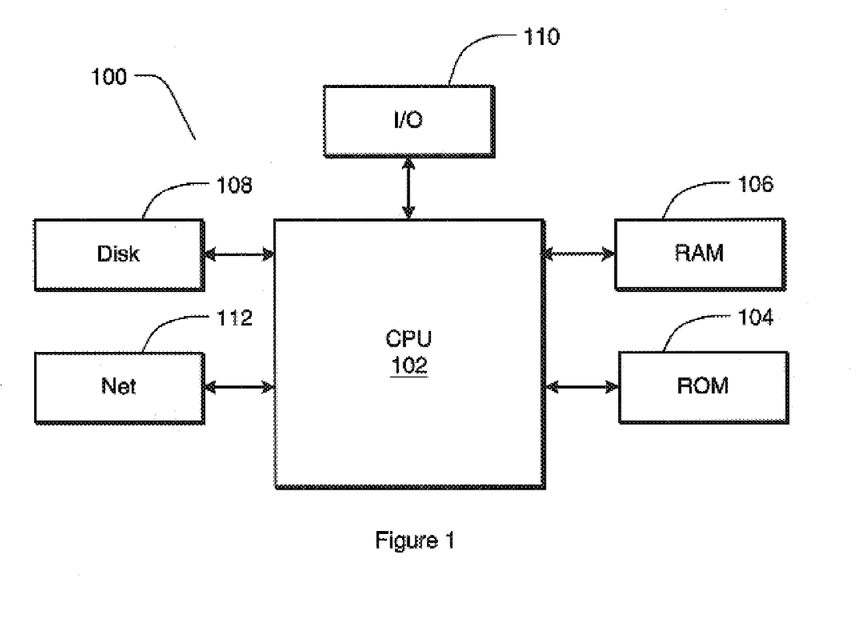
FIG. 1 is a block diagram of a general-purpose computer that may be used to practice aspects of the present invention.

FIG. 1 depicts general-purpose computer 100 which may be used to practice aspects in the present invention. The computer includes a CPU 102, which can read from a read only memory 104, which can read from and write to a random access memory 106, which can read from or write to a disk storage system 108, which can communicate across a network connection 112, and which can receive and send data via input output ports 110. Programs and routines may be stored on the disk storage 108, either a fixed or removable disk, be read into random access memory 106 and be executed on the CPU 102. The output of a routine running on the CPU may be input to a subsequent routine. The output of a routine may be data stored in random access memory, data stored on the disk storage system, data communicated via network connection, or data communicated across the output port. Similarly, the output of one part of a routine running on the CPU may be input to a subsequent part of same routine.

FIG. 2 depicts the hierarchical or parent-child relationship among subbands of a subband decomposition. A subband decomposition is applied to a signal. Signals of typical interest include a still photo, a segment of audio, or a segment of video. Other signals include 3D voxel data, which is used for medical data like MRI's, and 3D polygonal mesh data (i.e. defining a 3D surface as a bunch of polygons). These categories are often further refined in accordance with signal processing requirements. For instance, nature photography may be distinguished from satellite photography, where low-frequency features of nature photography are most interest, while high frequency features of satellite photography are most interest. A wide variety of subband decomposition techniques have been developed, including lifting functions and families of discrete wavelet transforms. A broad view of subband decompositions includes discrete cosine transforms, which it been adopted for JPEG, MPEG and HDTV standards. Reviews of subband decompositions can be found in Kolarov et al., U.S. Pat. No. 6,144,733, "Wavelet-Based Data Compression" (issued Nov. 7, 2000) and Ferriere, U.S. Pat. No. 5,880,856, "Progressive Image Transmission Using Discrete Wavelet Transforms" (issued Mar. 9, 1999). Additional references potentially of interest include: R. Algazi and R. R. Estes, "Analysis based coding of image transform and subband coefficients" in *Applications of Digital Image Processing XVII*, volume 2564 of Proc. of the SPIE, pages 11–21, 1995; H Klock, A Polzer, and J Buhmann, "Region-Based Motion Compensated 3D-Wavelet Transform Coding of Video", in *IEEE Conference on Image Processing*, Oct. 26–29 1997, Santa Barbara; R. Kronland-Martinet, J. Morlet, and A. Grossman, "Analysis of Sound Patterns through Wavelet Transforms" Technical Report, Centre de Physique Theorique, 1987; and M. Unser and A. Aldroub, "A review of wavelets in biomedical applications" *Proceedings of the IEEE*, 84(4), pp. 626–638, 1996. Books addressing the wavelet and DCT decompositions include Pankaj N. Topiwala, ed., "Wavelet Image and Video Compression," Kluwer Academic Publishers (1998) and K. R. Rao, P. Yip, "Discrete Cosine Transform: Algorithms, Advantages, Applications," Academic Press Inc. (1998).

Figure 2A:
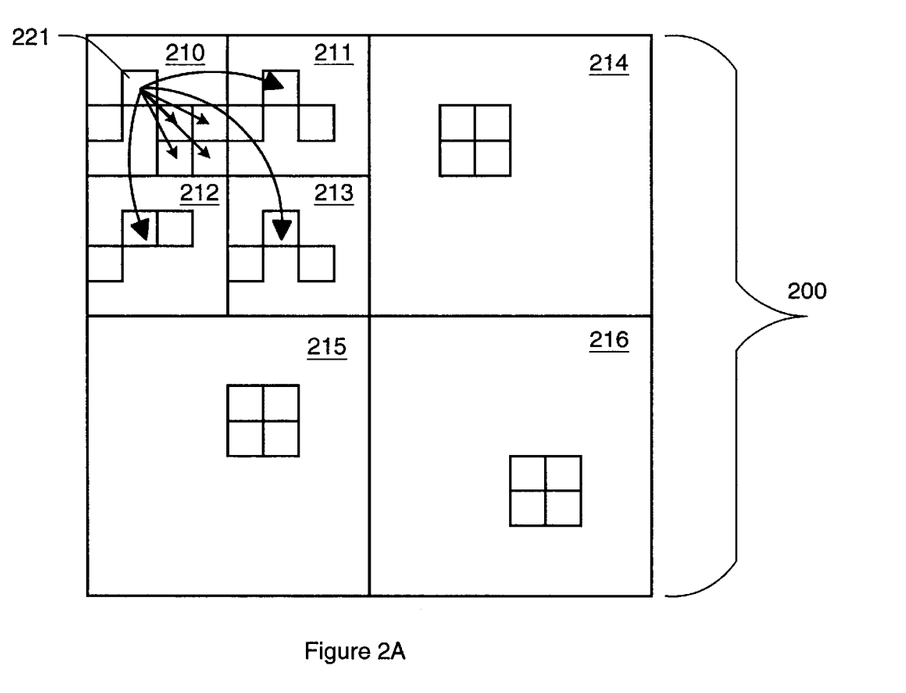
FIG. 2 is a block diagram of one hierarchical structure of a subband decomposition.
Figure 2B:
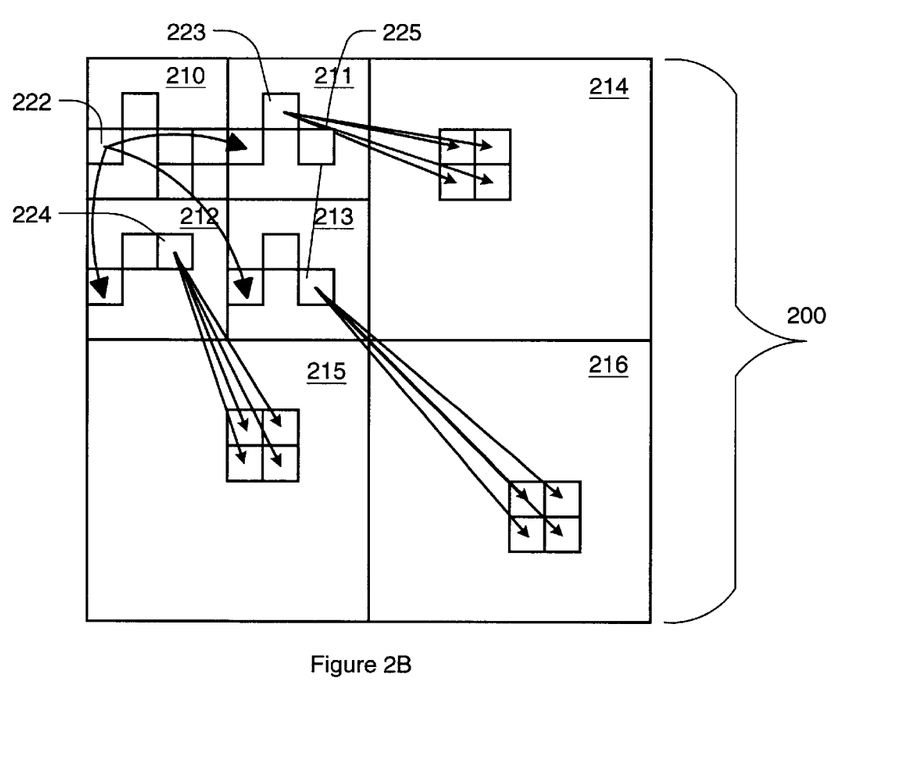

In the two level hierarchical decomposition of FIGS. 2A and 2B, a signal 200, for instance, a gray-scaled photograph, is represented by a square grid. A spatial orientation tree is defined in a pyramid that is constructed with recursive four-subband splitting. In the first level of decomposition, the image is separated into four subbands, including 214, 215 and 216, and an upper left quadrant. In the second level decomposition, the upper left quadrant is again separated into four subbands, including 210, 211, 212 and 213. In subband 210, the so-called lowpass subband, six pixels are depicted. In the subbands 211, 212 and 213, three pixels are depicted. In the subbands 214, 215 and 216, groups of four pixels are depicted. A coefficient is assigned to a pixel 221, for instance, corresponding to its gray scale value. Arrows lead from parent coefficients to child coefficients. In this particular tree organization, the upper left most coefficient (not numbered) is the root of the tree. The coefficient 221 in subband 210 has three children, one each in subband 211, 212 and 213. Coefficients in the upper left corner of subband 210 also have four children within subband 210. Coefficients in other subbands have groups of four children. Coefficient 221 in FIG. 2A has seven children coefficients, one in each of the subbands 211, 212 and 213 and a group of four in subband 210. Coefficient 222 in FIG. 2B has three children coefficients, one in each of the subbands 211, 212 and 213. Coefficients 223, 224 and 225 each has a group of four children coefficients, in subbands 214, 215 and 216, respectively. When coefficients in each subband of this grid are numbered with 0, 0 as the upper left most coefficient in the subband and all coefficients are given positive indices, general rules regarding the location of a coefficient's parent can be stated as follows:

For subband 210, coefficient (x, y) has its parent at (floor(x/2), floor(y/2)), in subband 210, where the floor( ) function is the integer part of the (operation).

For subbands 211, 212 and 213, coefficient (x, y) has its parent at (floor(x/2), floor(y/2)), in subband 210.

For subbands beyond 213 (in this two level decomposition case, subbands 214, 215 and 216), coefficient (x, y) of subband(i) has its parent at (floor(x/2), floor(y/2)), in subband(i-3) (in this case, subbands 211–213. )

More generally, various signals, signal sampling and tree structures can be used with the present invention. For different types of signals, coefficients may relate to samples other than pixels. A sound signal may be decomposed into amplitudes in different wavebands, instead of pixels. Other types of trees can be used. For images, Shapiro, J. M., "Embedded Image coding Using Zerotrees of Wavelet Coefficients"; IEEE Transactions on Signal Processing; vol. 41, No. 12, December 1993; pp. 3445–3462; and Pearlman, et al., U.S. Pat. No. 5,764,807 depict other tree structures that are compatible with aspects of the present invention.

Figure 3A:
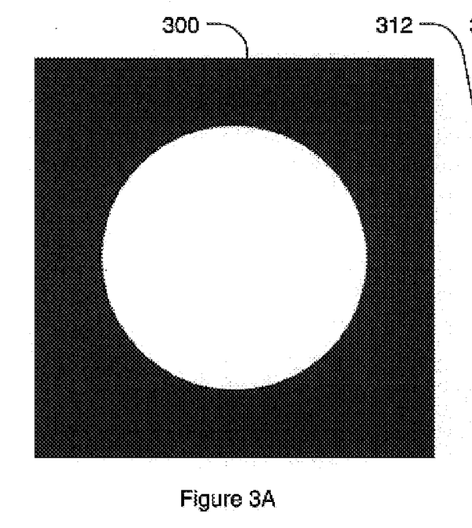
FIGS. 3A and 3B illustrate the operation of a type of wavelet decomposition on a circle.
Figure 3B:
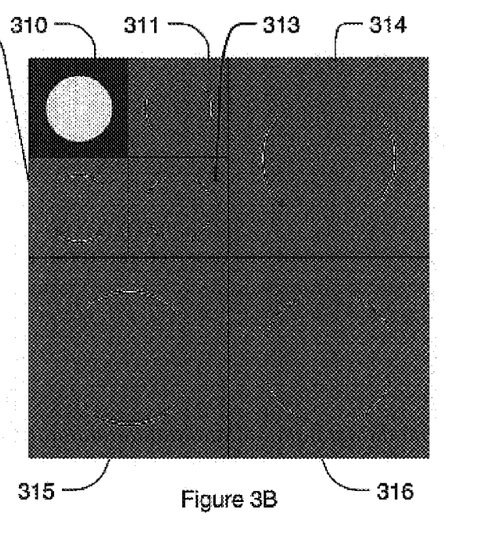

FIGS. 3A and 3B are an original image and a two-level subband decomposition, using a discrete wavelet transform. The original image in FIG. 3A is a white circle on a black background. Because the figure is of limited resolution, e.g. 256 by 256 pixels, the dividing line between white and black may appear slightly jagged. There are many different discrete wavelet transforms that can be applied to decompose the original image. One discrete wavelet transform divides an image in four subbands using filters including a low pass or averaging filter, a vertical edge detection filter, a horizontal edge detection filter and a diagonal edge detection filter. FIG. 3B depicts two applications of such a discrete wavelet transform. The low pass, after two decompositions is 310. The vertical edge filter in the first pass produces 314. The horizontal and diagonal edge filters in the first pass produce 315 and 316, respectively. In the second pass, the vertical, horizontal and diagonal edge filters produce results in 311, 312 and 313, respectively. One property of this discrete wavelet transform is that the result is the same size, data-wise, as the original image.

One set of filters that are efficient to implement are the 3/5 biorthogonal wavelet transform of Cohen-Daubechies-Feauveau (A. Cohen, I. Daubechies, and J. Feauveau, "Biorthogonal Bases of Compactly Supported Wavelets"; Comm Pure. Appl. Math., vol. 45, pp. 485–560; 1992). For analysis of the image into the pyramid, the filter [−½ 1−½] is used for the highpass and [−⅛ ¼ ¾ ¼−⅛] for the lowpass.

For synthesis of the pyramid back to an image, the filter [½ 1 ½] is used for the lowpass and [−⅛−¼ ¾−¼−⅛] is used for the highpass. There are numerous wavelet transforms that are appropriate for different image characteristics or less frequency aliasing at the cost of larger impulse responses (A. Aldroubi and M. Unser. "Families of Multiresolution and Wavelet Spaces with Optimal Properties"; Numer. Funct. Anal. Optim., 14:417–446; 1993.). There are also non-linear wavelet-like transforms appropriate for lossless analysis (M. D. Adams and F. Kossentini, "Reversible Integer-to-Integer Wavelet Transforms for Image Compression: Performance Evaluation and Analysis"; IEEE Trans. Image Proc. vol. 9 pp. 1010–1024; 2000).

Figure 4A:
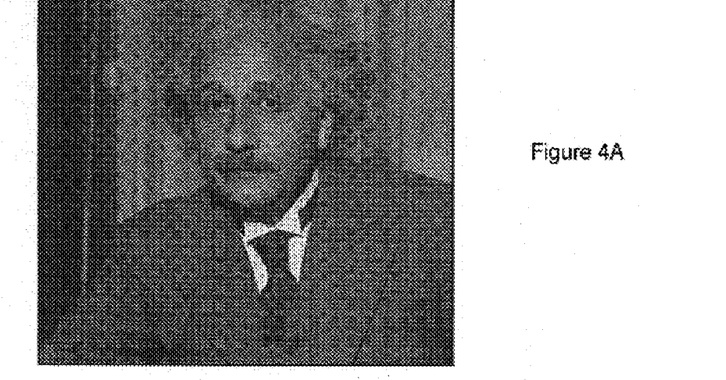
FIGS. 4A, 4B and 4C illustrate the operation of a type of wavelet decomposition on a portrait of Albert Einstein.
Figure 4B:
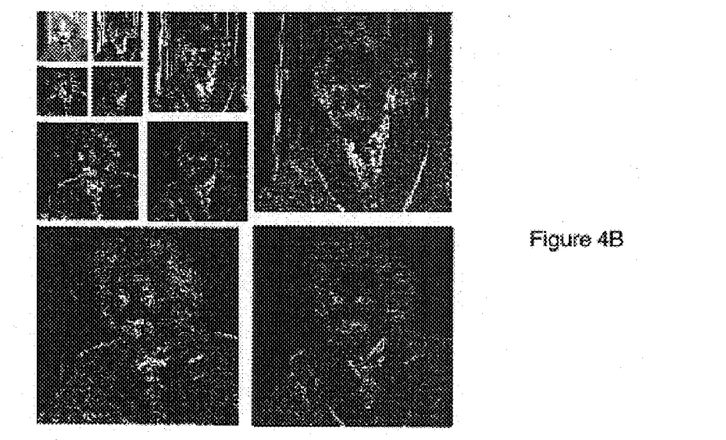
Figure 4C:
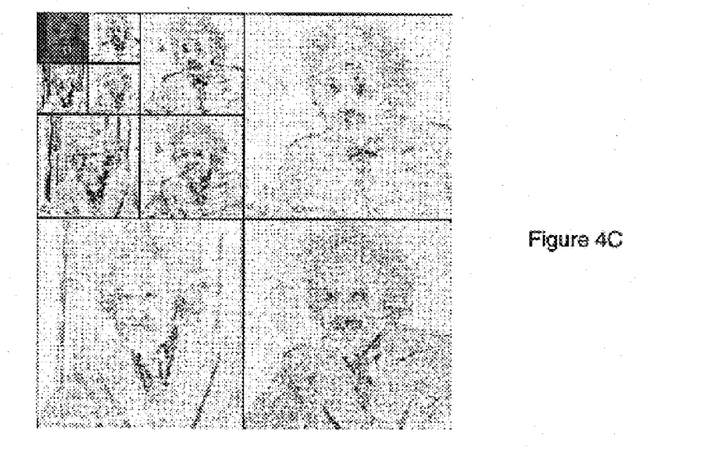

FIGS. 4A through 4C apply a three-level discrete wavelet transform to generate a subband decomposition of a portrait of Albert Einstein. The original image in FIG. 4A is an eight-bit, 256 gray level still photograph 256 by 256 pixels. The three-level decomposition appears in FIG. 4B. To highlight the information content of the decomposition, the subbands other than the low pass subband in the upper left most quarter are reversed in FIG. 4C. Application of these subband decomposition is fully reversible, to produce an image with the same details the original image. These decompositions typically are performed in order to create data structures that can readily be reordered for effective compression by methods such as adaptive arithmetic encoding or run length encoding. Sometimes, these decompositions are performed in order to isolate features of the original signal that are of greatest interest.

Figure 5:
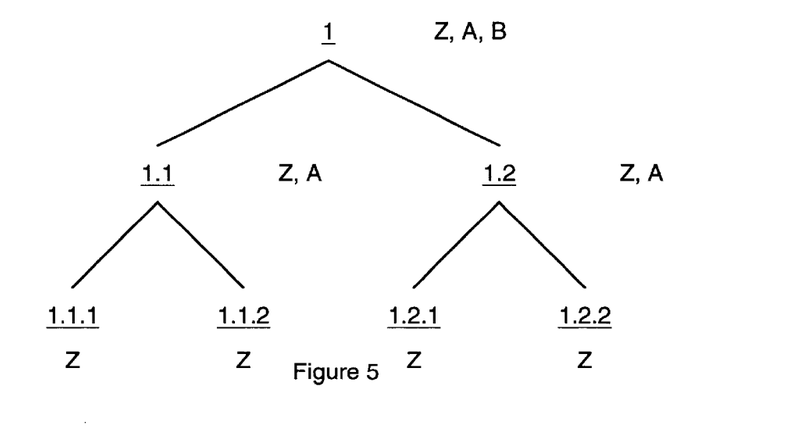
FIG. 5 illustrates a simplified data structure including coefficients, parent-child relationships among the coefficients, A-tree leading zeros value and B-tree leading zeros value.

FIGS. 5 through 7 illustrate encoding and decoding aspects of the present invention. FIG. 5 depicts the format used in FIGS. 6 and 7. Adjacent to the nodes of FIG. 5, there are two to four positions for data. A coefficient is present at the center of the node. This coefficient, for instance, may represent an eight-bit gray scale value from a portrait of Albert Einstein. Adjacent to the coefficients are one to three additional values labeled Z, A and B. The "Z" value is the number of leading zeros in the binary version of the coefficients. Each coefficient has a Z value. The "A" value may be referred to as the A-tree leading zeros value. Coefficients that have children (1.1 and 1.2) have A values. The "B" value may be referred to as the B-tree leading zeros value. Coefficients that have grandchildren (1) have B values. For a particular coefficient, the A-tree of that coefficient's parent includes all the children coefficients, grandchildren coefficients, and later generation descendants of that parent coefficient, but not the parent coefficient itself. For a particular coefficient, the B-tree of that coefficient's grandparent includes its grandchildren coefficients and later generation descendants of that grandparent coefficient, but not the grandparent coefficient itself, and not any of the parent coefficients which are children of the grandparent. A coefficient has no "A" value if it has no children; a coefficient has no "B" value if it has no grandchildren. The A-tree leading zeros value is the minimum number of leading binary zeros present in any of the coefficients of the A-tree. Similarly, the B-tree leading zeros value is the minimum number of leading binary zeros present in any of the coefficients of the B-tree. Calculation of these values will become apparent in FIGS. 6A through 6E. The nodes in FIG. 5 are hierarchically numbered. At the top of the tree is node 1. In the left-hand child position is node 1.1. In the left most grandchild position is node 1.1.1. This numbering convention will be used in referring to FIGS. 6 and 7, although node numbers have been omitted from the subsequent figures, to reduce visual clutter.

FIGS. 6A through 6E are an example of preparing data for compression, including translating for output coefficients received in a data stream. This example is too simple to correspond to a subband decomposition of a signal, but it illustrates a method. This example has been simplified by selecting coefficients such that all of the calculations performed result in positive coefficients. In practice, some coefficients are negative. One technique for dealing with negative numbers is to capture the magnitude of the coefficient and append a sign bit, if necessary. Another technique is to use a ones-complement or twos-complement string representing the negative number. Any technique of representing negative numbers that is compatible with the compression scheme used, after preparing the data for compression, can be applied to the methods and devices of the present invention.

Figure 6A:
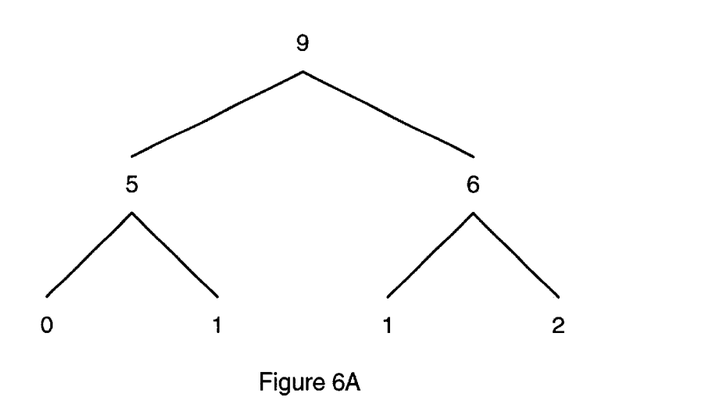
FIGS. 6A–6E illustrate one encoding scheme that practices aspects of the present invention.
Figure 6B:
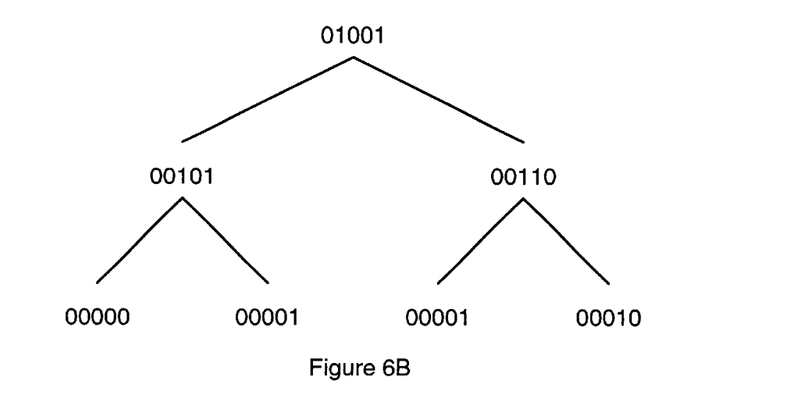

The initial coefficient values of this example are represented in decimal form in FIG. 6A. At node 1, the value is 9; at 1.1, the value is 5 and at 1.1.1, the value is 0. FIG. 6B depicts these initial values as five-bit binary numbers. Five-bit binary numbers represent 32 possible coefficient values, 0 to 31.

Figure 6C:
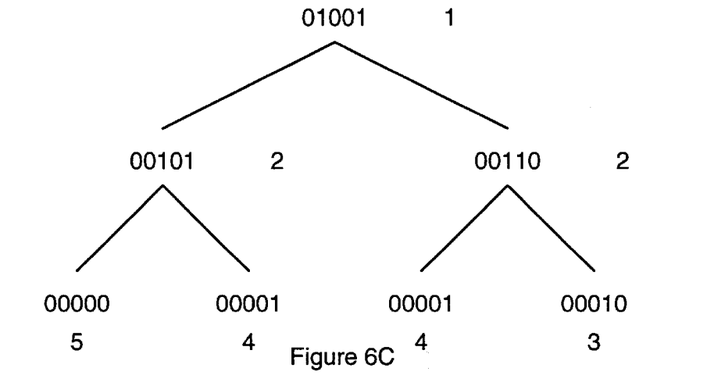

FIG. 6C adds a decimal count of leading zeros for each of the coefficients in the tree. The leading zero value of coefficient 1 is 1; of 1.1 is 2; and of 1.1.1 is 5. This is used to calculate various functions of the A-tree and B-tree leading zeros value.

Figure 6D:
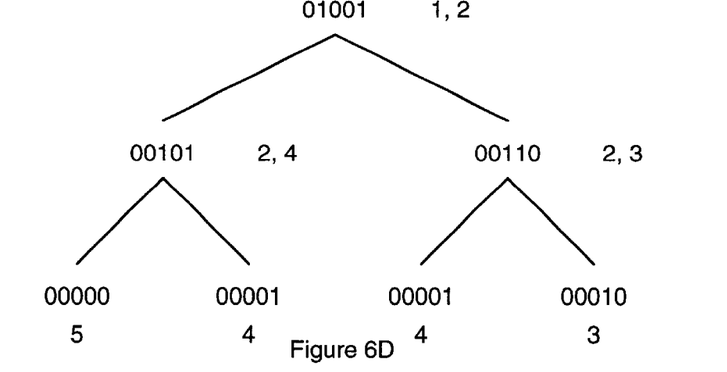

In FIG. 6D, the A-tree leading zeros value are added, in decimal, to each of the coefficients that have children coefficients. That is, A-tree leading zeros value are added to 1, 1.1, and 1.2, but not to coefficients at the lowest level of the tree, because those coefficients do not have children. At the top of the tree, the A-tree leading zero value is the least number of leading zeros in any of its children coefficients or their descendants, which collectively are the nodes below the top of the tree. Scanning those nodes, the least zero value calculated in FIG. 6C for any node below the top of the tree is 2. Thus, the A-tree leading zero value for the top node is 2. For nodes 1.1 and 1.2, the A-tree values are 4 and 3, respectively. Note that the A-tree value of the grandparent coefficient 1 is always less than or equal to the A-tree value of the parent coefficients 1.1 or 1.2, which are the next level down in the tree. This is helpful in understanding a method of preparing A-tree leading zeros value in a single pass through a suitable data structure.

Figure 6E:
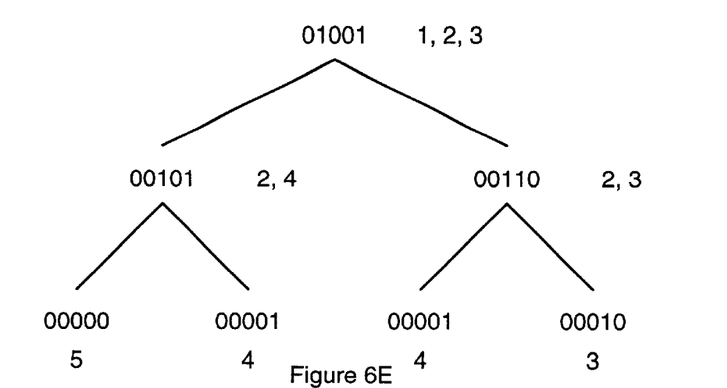

FIG. 6E adds the B-tree leading zeros value for the top node 1 of this tree, which is the only coefficient in the tree that has grandchildren coefficients. The B-tree leading zeros value is the least number of leading zeros found among the grandchildren coefficients of the subject coefficient or any of the decedents of those grandchildren coefficients. The B-tree leading zeros value is always greater than or equal to the A-tree leading zeros value associated with a coefficient. In FIG. 6E, node 1 has a B-tree leading zeros value of 3. Note that this is equal to the least A-tree value of the child coefficients 1.1 or 1.2.

Continuing from FIG. 6E, an encoding that practices aspects of the present invention proceeds as follows. The encoding program receives data corresponding to a subband decomposition of a signal. This data includes coefficients, parent-child relationships among the coefficients, A-tree leading zeros value associated with the coefficients, and B-tree leading zeros value associated with the coefficients. Encoding proceeds by walking the tree, so that parent coefficients are visited before their children coefficients. The encoding illustrated here utilizes a breadth first tree walk, so that coefficients 1.1 and 1.2 are encoded before coefficient 1.1.1.

In general, when the walk reaches a particular coefficient, if the coefficient has a grandparent and the grandparent's B-tree leading zero value has not been translated for output, it is translated. A knot translation can be used. In this translation, a value is generally indicated by like quantity of zeros preceding a 1. For instance, the value zero is indicated by "1"B. The value 5 is indicated by "000001"B. One improvement on this knot translation is that a value equal to the largest allowed value is indicated by a string of zeros, without a following one. For example, if the value six is the largest possible value for a B-tree leading zeros value, then the value six can be indicated by "000000"B. Other translations than the knot translation can be applied consistent with the present invention. Continuing with the method in general, a function of the grandparent's B-tree leading zero value and its A-tree leading zero value can be translated, because the grandparent's B-tree leading zero value is guaranteed to be greater than or equal to the grandparent's A-tree leading zero value. When the function applied is the A-tree leading zero value minus the B-tree leading zero value, the value subject to the knot translation is often represented by fewer bits.

While the tree walk is visiting the particular coefficient, if the coefficient has a parent coefficient and the parent's A-tree leading zero value has not been translated, it is translated. A function of the parent's A-tree leading zero value and the grandparent's B-tree leading zero value can be translated, because the grandparent's B-tree leading zero value is guaranteed to be greater than or equal to the parent's A-tree leading zero value. When the function applied is the parent's A-tree leading zero value minus the grandparent's B-tree leading zero value, the value translated by the knot translation is often represented by fewer bits.

The particular coefficient itself is also translated. The A-tree leading zero value of the coefficient's parent coefficient is encoded in this method, so leading zeros in the coefficient equal to the parent's A-tree leading zero value are stripped away. One translation for the remaining bits, after removal of the specified number of leading zeros, is to use the coefficient itself, with an appended sign bit. Other translations may be used. The translation for a coefficient may be different from the translations used for leading zeros value.

The translated values related to the coefficient can be output or queued for output.

The tree in FIG. 6E can be translated as follows:

| | |
|---|---|
| coefficient 1: | 01001; |
| coefficient 1.1: | 2, as 001; 101; |
| coefficient 1.2: | 110; |
| coefficient 1.1.1: | 3 − 2 = 1, as 01; 4 − 3 = 1, as 01; 0; |
| coefficient 1.1.2: | 1; |
| coefficient 1.2.1: | 3 − 3 = 0, as 1; 01; and |
| coefficient 1.2.2: | 10. |

Applying knot encoding, the fully translated string, with blanks inserted for readability is 01001001101110010101110110.

One encoding variation is to encode A-tree leading zero values and B-tree leading zero values, without using a function (e.g., A-tree minus B-tree) to reduce the magnitude of the values being encoded. Another variation is only to encode A-tree leading zero values and coefficient values (ignoring the B-tree leading zero values). This avoids a second dereference to find the grandparent of the current coefficient, but at a cost of up to 10% encoding quality. Another variation is to only encode B-tree leading zero values and coefficient values, at the cost of up to 50% encoding quality.

The encoding process previously described is entirely reversible. FIGS. 7A–7K depict decoding of the string that we encoded above: 01001001101110010101110110.

The number of bitplanes in this example is 5. The structure of the coefficients is depicted in FIG. 5. In practice, the number of bitplanes and the structure of the coefficients can either be known in advance or transmitted as part of the data stream. This holds for both data streams received by the encoder and the decoder.

Figure 7A:
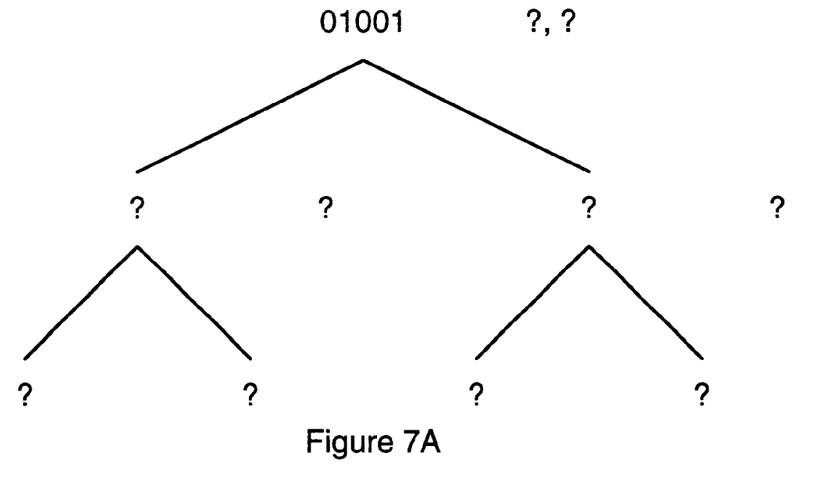
FIGS. 7A–7K illustrate one decoding scheme that practices aspects of the present invention.

FIG. 7A illustrates capturing the root coefficient in position 1. The root coefficient has no parent or grandparent coefficient. The number of bits representing the root coefficient is the number of bitplanes that were encoded. Accordingly, the first five bits of the data, "01001"B are the root coefficient.

Figure 7B:
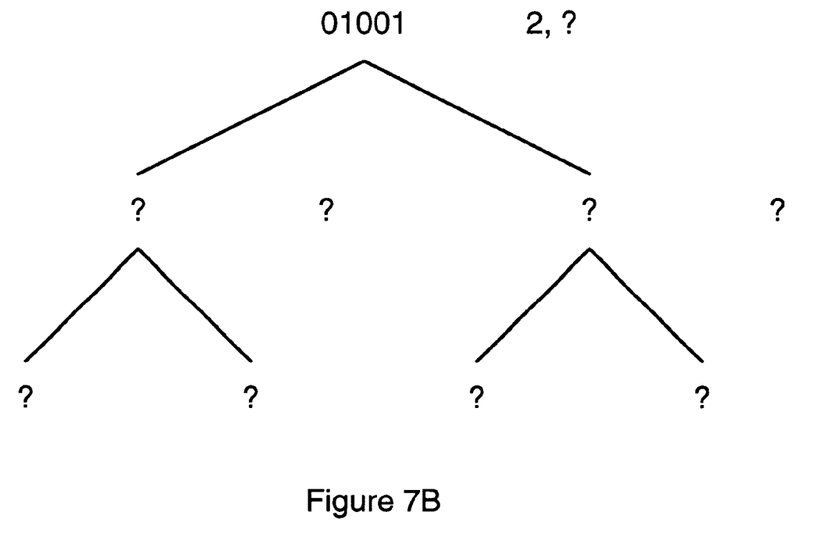

FIG. 7B illustrates capturing the A-tree leading zeros value for the parent of the coefficient in position 1.1, which has a parent but no grandparent. At this point, the remaining string is "00110111001010110110"B. This leading zeros value is translated using knot notation. Bits in the data string are read until either five zeros have been encountered or a "1" has been encountered. The remaining, unprocessed data string begins with "001"B, which corresponds to an A-tree leading zeros value of 2. (As illustrated for FIG. 7F below, more is involved when a coefficient has both a parent and a grandparent coefficient. Here, because there is no grandparent coefficient, the B-tree leading zeros value of the grandparent coefficient is treated as 0.)

Figure 7C:
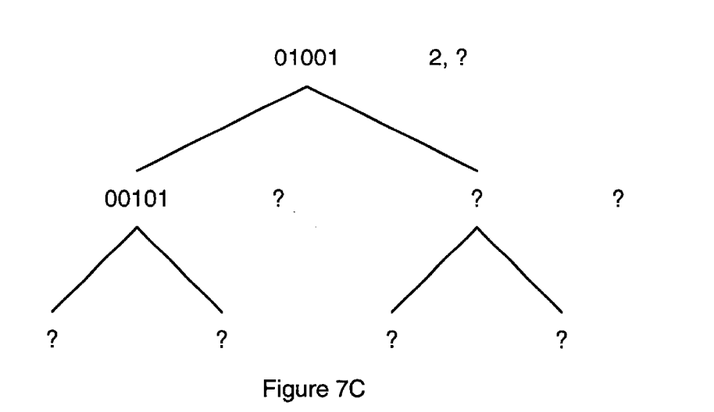

FIG. 7C illustrates capturing the coefficient value for position 1.1. At this point, the remaining string is "10111001010110110"B. The A-tree leading zeros value of the parent coefficient is two and the number of bitplanes is five, so coefficient 1.1 is expressed in three bits, "101"B. This string, with two leading zeros, is coefficient 1.1.

Figure 7D:
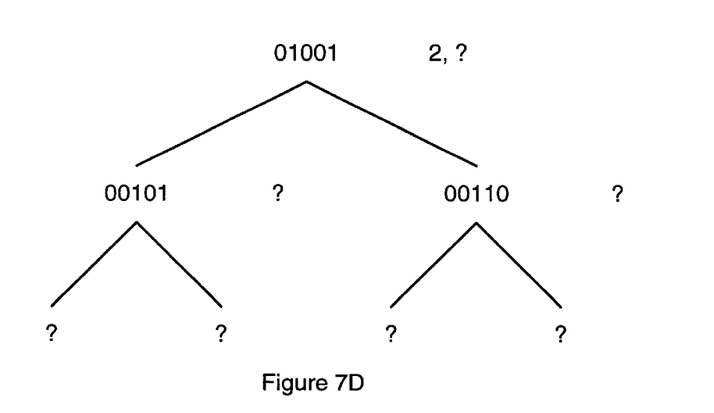

FIG. 7D illustrates capturing the coefficient value for position 1.2. At this point, the remaining string is "11001010110110"B. This coefficient, like the prior coefficient, does not have a grandparent, but does have a parent. The A-tree leading zeros value of the parent is 2. Because we have 5 bitplanes, we read the next three bits, "100"B.

Figure 7E:
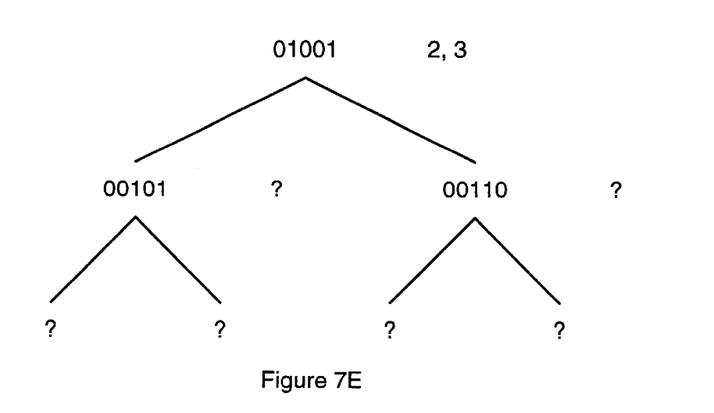

FIG. 7E illustrates capturing the B-tree leading zeros value of the grandparent of the coefficient in position 1.1.1. At this point, the remaining string is "01010110110"B. This coefficient has both a parent and a grandparent. In this example the present invention, a function of the grandparent's A- and B-tree leading zeros values is next in the data stream. Using knot notation, we read the bits "01"B, which translates to the value 1. The function used in this example is the grandparent's A-tree leading zeros value minus the grandparent's B-tree leading zeros value. The value 1 is added to the grandparent's A-tree leading zeros value of 2. Thus, the grandparent's B-tree leading zeros value is 3.

Figure 7F:
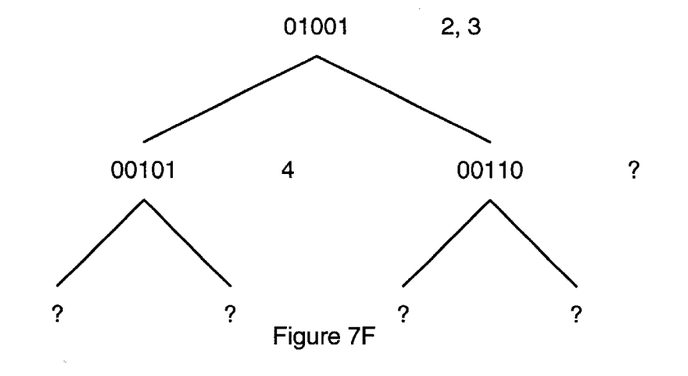

FIG. 7F illustrates capturing the A-tree leading zeros value for the parent of the coefficient in position 1.1.1. At this point, the remaining string is "010110110"B. Using knot notation, the bits "01"B translate to the value 1. In this example, this value represents a function of the B-tree leading zeros value of the grandparent coefficient and the A-tree leading zeros value of the parent coefficient. The value 1 is added to the grandparent's B-tree leading zeros value of 3. Thus, the parent's A-tree leading zeros value is 4.

Figure 7G:
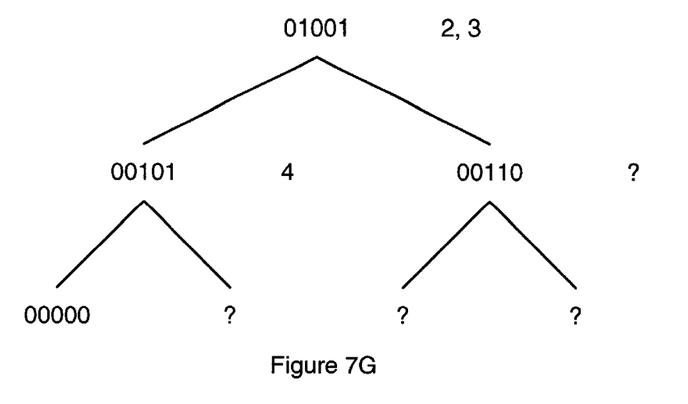

FIG. 7G illustrates capturing the coefficient in position 1.1.1. At this point, the remaining string is "0110110"B. The parent's A-tree leading zeros value is 4 and the number of bitplanes is 5, so this coefficient is encoded by a single bit, which is "0"B. The coefficient is "00000"B.

Figure 7H:
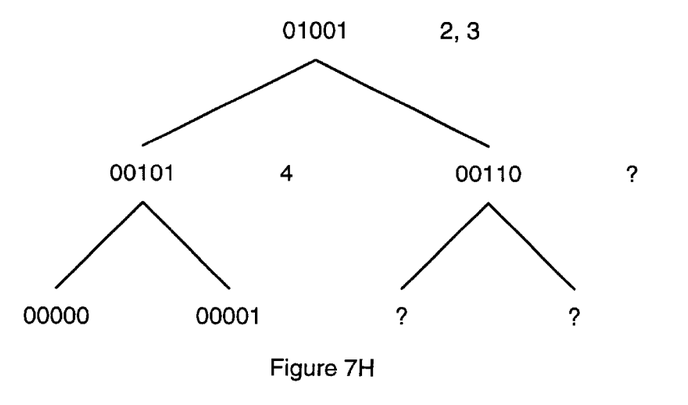

FIG. 7H illustrates capturing the coefficient in position 1.1.2. At this point, the remaining string is "110110"B. This coefficient also is encoded by a single bit, which is "1"B. The coefficient is "00001"B.

Figure 7I:
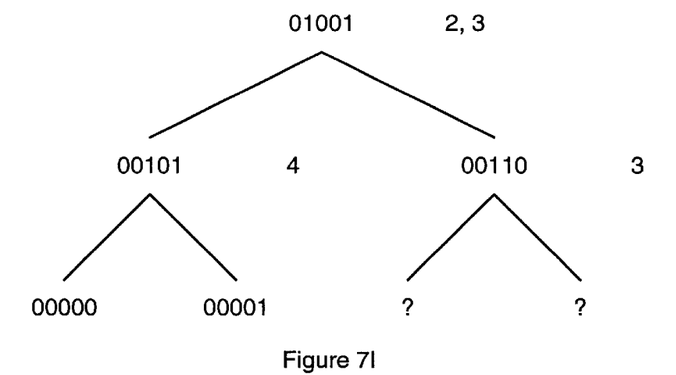

FIG. 7I illustrates capturing the A-tree leading zeros value for the parent of the coefficient in position 1.2.1. At this point, the remaining string is "10110"B. Using knot notation, the bit "1"B translates to the value zero. Thus, the A-tree leading zeros value of the parent coefficient is the same as the B-tree leading zeros value of the grandparent coefficient, or 3.

Figure 7J:
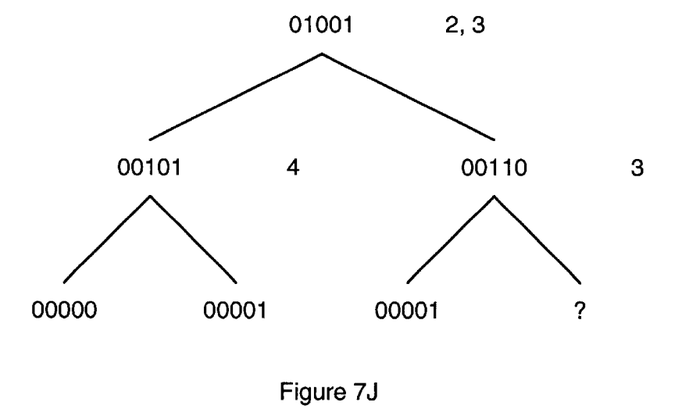

FIG. 7J illustrates capturing the coefficient in position 1.2.1. At this point, the remaining string is "0110"B. The parent's A-tree leading zeros value is 3, so this coefficient is captured in two bits. The coefficient is "00001"B.

Figure 7K:
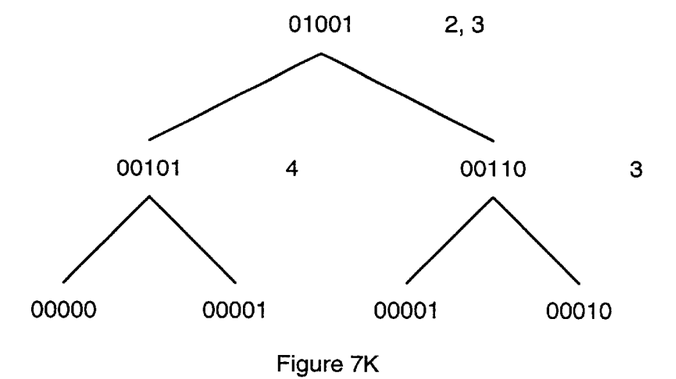

FIG. 7K illustrates capturing the coefficient in position 1.2.2. At this point, the remaining string is "10"B. The parent's A-tree leading zeros value is 3, so this coefficient is captured in two bits, which matches the number of remaining bits. The coefficient is "00010"B. The coefficient values in FIG. 7K match the values in FIG. 6B. The full tree in this figure matches FIG. 6E.

A data structure composed of a series of arrays allows efficient encoding and decoding of the A-tree, B-tree, and coefficient values. A subband decomposition can be referred to as a pyramid of coefficients, given the parent-child relationships illustrated in FIGS. 2A–2B. A one to one mapping from the integers [0, n−1] to the pyramid coefficients (where n is the number of coefficients) is defined such that a parent coefficient is listed before any of its children. This effectively represents the pyramid in an array. Following this mapping, the following arrays are used to associate information with the pyramid coefficients:

pyr_elemArray: an array of pointers to the pyramid coefficients (to facilitate decoding);

a_zerosArray: an array of integers representing the A-tree values associated with the given coefficient;

b_zerosArray: an array of integers representing the B-tree values associated with the given coefficient;

quant_magArray: an array of integers representing the quantized magnitudes of the given coefficient;

attribArray: an array of integers whose individual bits represent:
the signs of the given coefficient;
if the A-tree zero value has been sent/received for the given coefficient;
if the B-tree zero value has been sent/received for the given coefficient; and parentArray: an array of integers whose value is the array index representing the parent of the given coefficient.

Once populated, this array structure allows the pyramid of coefficients to be encoded and decoded in a single pass.

Alternative data structures also are useful. In the embodiment above, pyr_elemArray could be an array of coefficients, instead of pointers to coefficients. Any or all of the arrays could be practiced as a set of arrays, for instance when a color signal is decomposed in a RGB, CYMK or LAB color space or a sound signal is decomposed in to high, treble and bass channels. Separate arrays can be maintained for different signal channels, different subbands or both. A group of subband arrays processed in an order equivalent to processing a single array is certain equivalent to concatenating the subband arrays into a single array.

The data structures of this invention are useful if they include fewer than all of the arrays listed above. For instance, an array of coefficients (or pointers to coefficients) and parallel A-tree and B-tree zero value arrays, without any further arrays, would be useful. Adding to this combination a parentArray identifying the parent coefficients, either by pointer or by array index, would be useful. Adding a quant_magArray for quantized coefficients would be further useful.

Some data structures useful in practicing aspects of the present invention break sharply from the teachings of Said et al., Image Compression Using the Spatial-Orientation Tree, May 1993, pp. 279–282; Said, A. & Pearlman, W. A., "Image Compression Using the Spatial-Orientation Tree," IEEE Int. Symp. on Circuits and Systems, vol. 1, May 1993, pp. 279–282; and Shapiro, J. M., "Embedded Image coding Using Zerotrees of Wavelet Coefficients"; IEEE Transactions on Signal Processing; vol. 41, No. 12, Dec. 1993; pp. 3445–3462. A patent issued on work by Pearlman, et al., U.S. Pat. No. 5,764,807, summarizes the data structure created as "a list of insignificant sets of points . . . , wherein each set of the LIS is designated by a root node within the subband decomposition and has a corresponding tree structure of points within the subband decomposition. The tree structure is organized as points comprising descendants and offspring of the root node, wherein a first generation of the descendants comprises the off-spring." This list of insignificant points structure facilitated progressive encoding of embedded images, one bit plane at a time. Progressively encoded images, when decoded, appear on a user's screen as a fuzzy image which gains resolution, instead of popping full-formed into view.

The data structures of the present invention facilitate non-progressive encoding, and could be used with progressive encoding as well.

Another aspect of the present invention is a method of calculating A-tree leading zero values and B-tree leading zero values in a single pass through a plurality of arrays holding coefficients and associated values. This method may begin with receiving data corresponding to a subband decomposition of a signal, including coefficients and parent-child relationships among the coefficients. As described above, the signal can be virtually any type of digital signal; the examples in the figures depict a grey-scale photograph, but many other types of signal can be processed in the same fashion. A signal is represented by coefficients. Parent-child relationships are defined among the coefficients.

The data corresponding to the subband decomposition of a signal may be accompanied by data describing the dimensions of the pre-decomposition signal. It may further include the number of levels of decomposition. It also may include a count of the number of levels of decomposition applied to the signal. The channels of the signal, such as RGB, CYMK or LAB or high, treble and bass can be identified in the data. The data may be organized so that the parent-child relationships among subband decomposition coefficients are implicit in the organization, whether or not the data includes dimensions of the pre-decomposition signal. Alternatively, there may be explicit links between parents and children.

The calculation method proceeds by visiting the coefficients, children coefficients before their parent coefficients. For instance, if an array holds all of the coefficients, parents before children, the array could be processed from end to beginning or if it holds children before parents, it could be processed from beginning to end. A tree structure would be walked beginning at the bottom.

References pointing to parent and grandparent coefficients can be assembled in the same pass that the leading zero values are calculated, in an earlier pass, or by using a template data structure adapted to the dimensions of the signal. The references to parent and grandparent coefficients can be separate or grandparent coefficients can be reached through parent coefficients. The references can be pointers, array indexes or any other suitable data identifying the ancestor coefficients.

As the coefficients are visited, a B-tree leading zero value is calculated and stored with a grandparent coefficient of the coefficient visited, if the coefficient visited has a grandparent. A B-tree leading zero value for a grandparent of the visited coefficient can be calculated as the lesser of (i) a number of leading zeros in the visited coefficient or (ii) an A-tree leading zeros value associated with the visited coefficient, if the visited coefficient has children coefficients, or (iii) the B-tree leading zero value previously associated with the grandparent coefficient. The calculation of a B-tree leading zero value for a particular grandparent coefficient is a process of accumulation. Several coefficients are visited which are descendents of the same grandparent coefficient. Each time one of the grandchildren is visited, the B-tree leading zero value stays the same or decreases.

Similarly, as the coefficients are visited, an A-tree leading zero value is calculated and stored with a parent coefficient of the coefficient visited, if the coefficient visited has a parent. An A-tree leading zero value for a parent of the visited coefficient can be calculated as the lesser of (i) a number of leading zeros in the visited coefficient or (ii) an A-tree leading zeros value associated with the visited coefficient, if the visited coefficient has children coefficients, or (iii) the A-tree leading zero value previously associated with the parent coefficient. The calculation of an A-tree leading zero value for a particular parent coefficient is a process of accumulation. Several coefficients are visited which are descendents of the same parent coefficient. Each time one of the children is visited, the A-tree leading zero value stays the same or decreases.

The B-tree and A-tree leading zero values can be stored in memory or output. The memory may be a random access, disk, non-volatile or other memory, including memory for another process or logic segment to use. The output may be to magnetic media for storage or to another process or logic segment to use.

Encoding data for compression is a further aspect of the present invention. Encoding may begin with receiving data corresponding to a subband decomposition of a signal, including coefficients, parent-child relationships among the coefficients, A-tree leading zeros values associated with the coefficients, and B-tree leading zeros values associated with the coefficients. For instance, the output of the process describe above could be the input to this process. Other forms of expressing the relationships among the coefficients and of calculating the A-tree and B-tree leading zeros values may equally well be the starting point for this process. The received data also may include dimensions of the pre-decomposition signal. Parent-child relationships among the coefficients may be implicit in the organization of the received data. Alternatively, the data may include explicit links, either from parents to children or vice-versa.

The method proceeds with visiting the coefficients, parent coefficients before their children coefficients. If the coefficients are stored in an array, parents before children, the method could begin at the start of the array. For the visited coefficients, the following translations may take place. (a) If the visited coefficient has any grandparent coefficient and the grandparent coefficient has not previously been translated, the first translation may be a function of the grandparent's A-tree and the B-tree leading zeros values. For instance, the difference of the B-tree minus the A-tree leading zeros values may be small, and always will be non-negative. (b) If the visited coefficient has any parent coefficient and the parent coefficient has not previously been translated, translating a function of the A-tree leading zero value associated with a parent coefficient of the visited coefficient and of the B-tree leading zero value associated with the grandparent coefficient of the visited coefficient, wherein the B-tree leading zero value associated with the grandparent coefficient is assigned a predetermined value if the visited coefficient does not have any grandparent coefficient. The function, for instance, may be the difference of the A-tree leading zeros value of the parent minus the B-tree leading zeros value of the grandparent coefficient. This difference may be small and always will be non-negative. These steps could be performed in the order (a)–(b) or vice-versa. Translating in (a) & (b) may need to be done only once for each grandparent node. A bit flag or equivalent structure may be used to account for whether a particular node has been translated yet, in one way and another. Alternatively, a rule may be adopted based on knowledge of the tree structure, so that the (a) or (b) translating step is carried out for a grandparent or parent coefficient on the first, last or other occasion that it is accessed. One potential translation of the functions (a) & (b) is using knot encoding, as described above. The (a), (b) and visited coefficient translations need not use the same translation. In particular, the (a) & (b) translations may use a first translation and the translating the visited coefficient step may use a second, different translation.

While still at the visited coefficient, the method may include translating at least part of the visited coefficient starting in a next place of the visited coefficient, if any, beyond a place indicated by the A-tree leading zero value of the parent coefficient, if the parent coefficient exists, or in a first place of the visited coefficient if the parent coefficient does not exist. Equivalent to this handling of coefficients without parents is creating a root which has no coefficient value and setting a special coding rule for the root, such as the root does not need to be coded because no value is assigned to it and because it does not have any parent or grandparent. Parts of a coefficient beyond the leading zeros indicated by the A-tree leading zero value of the parent coefficient may suitable be translated as themselves. That is, for a leading zeros value of 3, the string 00001111 may be translated as 01111. Other translations also may be used, or they may be part of a compression process, which utilizes output from the translations associated with the visited coefficient.

The output of these translations may include storing translated values in memory locations accessible to a subsequent process. Those memory locations may be random access memory, disk memory, non-volatile memory or any other suitable memory structure.

The method further may include compressing the outputted values. The compression suitably may be Huffman encoding, arithmetic encoding, adaptive arithmetic encoding, run length encoding or any suitable compression algorithm.

Depending on the structure of the pyramid of nodes, that is, the tree structure, the visiting of parent coefficients before their children may be implemented in a variety of equivalent ways. The visiting may be carried out beginning with a subband that includes a root node or having at least one coefficient that has no parent coefficient. Then, data for the subbands may be processed in scan line order. Alternatively, if the data includes a root node having no coefficient, the visiting may be carried out beginning with the root node and proceeding as a preorder tree walk. If the data includes a plurality of coefficients having no parent coefficients, then the visiting may proceed as a plurality of preorder tree walks, either in parallel or one after the next, starting at each of the coefficients having no parent coefficients.

Fewer than all of the bits of a coefficient may be translated. For instance, the coefficient may be quantized before or as a part of translation. Or, some or all of the coefficients of the decomposition may represented by fewer bits than available from the decomposition. A predetermined number of low order bits may be dropped. Different patterns of bit dropping may be applied to different channels.

A further aspect of the present invention is a method of decoding data that has been encoded in accordance with the present invention. Those of skill in the art will be able to practice the inverse or decoding process, from the encoding described above. In general terms, one aspect of the present invention populates a data structure based on data derived from a subband decomposition. The data structure may include coefficients, A-tree and B-tree leading zeros values and a structure (implicit or explicit) corresponding to parent-child relationships among the coefficients. The method may begin with receiving data derived from a subband decomposition of a signal. Typically, the data will be decompressed. Alternatively, a data decompression step may precede other decoding steps. Working with the data structure, the method proceeds with visiting coefficients in the data structure, parent coefficients before child coefficients and parsing one or more substrings from the data corresponding to the visited coefficient. For a visited coefficient that has a grandparent coefficient, translate a first substring into a function (a) of the A-tree leading zero value and the B-tree leading zero value both associated with a grandparent coefficient of the visited coefficient, calculating a B-tree leading zero value of the grandparent coefficient, and associating the B-tree leading zero value with the grandparent coefficient. The function (a) may be the difference of the A-tree minus the B-tree leading or any other suitable function. Further, for a visited coefficient that has a parent coefficient, translate a second substring into a function (b) of the A-tree leading zero value associated with the parent coefficient of the visited coefficient and of the B-tree leading zero value associated with the grandparent coefficient of the visited coefficient, where the B-tree leading zero value associated with the grandparent coefficient is assigned a predetermined value if the visited coefficient does not have any grandparent coefficient. The predetermined value may be zero. The function may be the difference of the A-tree minus the B-tree leading zeros value or any other suitable function. The A-tree leading zero value of the parent coefficient may be calculated using, if needed the function (a) & (b) results. The A-tree leading zeros value is then associated with the parent coefficient. This association may involve storing the value in a memory location. Depending on the encoding, the function (a) value may precede or follow the function (b) value in the data stream. Decoding should be adapted to the encoding actually used. This method further includes translating a substring corresponding to the visited coefficient, utilizing the A-tree leading zero value of the parent coefficient, if any, to determine the number of leading zeros of the visited coefficient, and associating the coefficient value with the visited coefficient.

This method of decoding may, implicitly or explicitly, accommodate negative coefficients. As described above, negative coefficients may be represented by their magnitude and a sign bit. The data decoded may include dimensions of the signal being decoded. It further may include information regarding the form of encoding, including the number of levels of decomposition, the number of bits encoded, and the like. The number of bits encoded may vary by subband, location within the field of the signal or other parameters. Based on information regarding the signal being decoded, this process may further include initializing a data structure to receive the coefficients. Initializing the data structure may include setting links to parent or grandparent coefficients, as by calculating array indexes or initializing pointers. For a signal of common dimensions, a template data structure with present links may be used.

While the preceding examples are cast in terms of a method, devices and systems employing this method are easily understood. A magnetic memory containing a program capable of practicing the claimed method is one such device. A computer system having memory loaded with a program practicing the claimed method is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A method of preparing A-tree leading zeros value and B-tree leading zeros value for data corresponding to a subband decomposition of a signal, including:
    receiving data corresponding to a subband decomposition of a signal, including coefficients and parent-child relationships among the coefficients;
    visiting the coefficients, children coefficients before their parent coefficients;
        updating a B-tree leading zero value associated with a grandparent coefficient of the visited coefficient by storing in memory a lesser value of (i) a number of leading zeros in the visited coefficient or (ii) an A-tree leading zeros value associated with the visited coefficient, if the visited coefficient has children coefficients, or (iii) the B-tree leading zero value previously associated with the grandparent coefficient, if the visited coefficient has any grandparent coefficient;
        updating an A-tree leading zero value associated with a parent coefficient of the visited coefficient by storing in memory a lesser value of (i) a number of leading zeros in the visited coefficient or (ii) an A-tree leading zeros value associated with the visited coefficient, if the visited coefficient has children coefficients, or (iii) the A-tree leading zero value previously associated with the parent coefficient, if the visited coefficient has any parent coefficient; and
    outputting the B-tree leading zeros value and the A-tree leading zeros value.

2. The method of claim 1, wherein the data further includes dimensions of the pre-decomposition signal and a count of levels of decomposition.

3. The method of claim 1, wherein the data is organized such that the parent-child relationships among coefficients are implicit in the organization.

4. The method of claim 1, wherein the parent-child relationships among coefficients are expressed as links from child coefficients to parent coefficients.

5. The method of claim 1, wherein the memory is a random access memory.

6. The method of claim 1, wherein the memory is a disk memory.

7. The method of claim 1, wherein the data further includes dimensions of the pre-decomposition signal.

8. The method of claim 7, wherein the data is organized such that the parent-child relationships among coefficients are implicit in the organization.

9. The method of claim 7, wherein the parent-child relationships among coefficients are expressed as links from parent coefficients to child coefficients.

10. The method of claim 7, wherein the memory is a random access memory.

11. The method of claim 7, wherein the memory is a disk memory.

12. A computer-assisted method of preparing data for compression, capable of preparing the data in a single pass, the method including:
    receiving data corresponding to a subband decomposition of a signal, including coefficients, parent-child relationships among the coefficients, A-tree leading zeros values associated with the coefficients, and B-tree leading zeros values associated with the coefficients;
    visiting the coefficients, parent coefficients before their children coefficients;
    for the visited coefficients, translating a set of values for output, including:
        (a) translating a function of the A-tree leading zero value and the B-tree leading zero value, both associated with a grandparent coefficient of the visited coefficient, if the visited coefficient has any grandparent coefficient and the grandparent coefficient has not previously been translated;
        (b) translating a function of the A-tree leading zero value associated with a parent coefficient of the visited coefficient and of the B-tree leading zero value associated with the grandparent coefficient of the visited coefficient, if the visited coefficient has any parent coefficient and the parent coefficient has not previously been translated, where the B-tree leading zero value associated with the grandparent coefficient is assigned a predetermined value if the visited coefficient does not have any grandparent coefficient;
        translating part of the visited coefficient starting in a next place of the visited coefficient, if any, beyond a place indicated by the A-tree leading zero value of the parent coefficient, if the parent coefficient exists, or in a first place of the visited coefficient if the parent coefficient does not exist; and
    outputting the translated values.

13. The method of claim 12, wherein the data further includes dimensions of the pre-decomposition signal.

14. The method of claim 12, wherein the data further includes dimensions of the pre-decomposition signal and a count of levels of decomposition.

15. The method of claim 12, wherein the data is organized such that the parent-child relationships among coefficients are implicit in the organization.

16. The method of claim 12, wherein the parent-child relationships among coefficients are expressed as links from child coefficients to parent coefficients.

17. The method of claim 12, wherein the parent-child relationships among coefficients are expressed as links from parent coefficients to child coefficients.

18. The method of claim 12, wherein the visited coefficient is represented as a magnitude plus a sign bit.

19. The method of claim 12, wherein the visited coefficient is translated from a complements representation to a magnitude plus a sign bit representation.

20. The method of claim 12, further including assigning a sign bit to the visited coefficient for output.

21. The method of claim 12, further including compressing the outputted values.

22. The method of claim 21, wherein the compression method is Huffman encoding.

23. The method of claim 21, wherein the compression method is arithmetic encoding.

24. The method of claim 21, wherein the compression method is adaptive arithmetic encoding.

25. The method of claim 21, wherein the compression method is run length encoding.

26. The method of claim 12, wherein the visiting is carried out beginning with a subband, the subband including a root node or having at least one coefficient that has no parent coefficient, and processing the data for the subbands in scan line order.

27. The method of claim 12, wherein the data includes a root node having no coefficient and the visiting is carried out beginning with the root node and proceeding as a preorder tree walk.

28. The method of claim 12, wherein the visiting is carried out beginning with a plurality of coefficients having no parent coefficients and proceeding as a plurality of preorder tree walks.

29. The method of claim 12, wherein the (a) translating and (b) translating steps are carried out only once for a particular grandparent or parent coefficient.

30. The method of claim 29, wherein the (a) translating step is carried out for the grandparent coefficient and the (b) translating is carried out for the parent coefficient on a first occasion when the any coefficient being visited relates respectively to the grandparent coefficient or the parent coefficient.

31. The method of claim 29, wherein the (a) translating step is carried out for the grandparent coefficient and the (b) translating is carried out for the parent coefficient on a last occasion when the any coefficient being visited relates respectively to the grandparent coefficient or the parent coefficient.

32. The method of claim 12, wherein the (a) translating and (b) translating steps use a first translation and the translating at least part of the visited coefficient step uses a second translation.

33. The method of claim 12, wherein the (a) translating, (b) translating and translating at least part of the visited coefficient steps use at least two different translations.

34. The method of claim 12, wherein (a) translating or (b) translating for output includes translating a 0 value to "1"B, a 1 value to "01"B, a 2 value to "001"B, and so on.

35. The method of claim 12, wherein (a) translating or (b) translating for output utilize knot encoding.

36. The method of claim 12, wherein (a) translating or (b) translating for output utilize modified knot encoding, wherein the largest value subject to translating is represented by a string of zeros having a length equal to the value.

37. The method of claim 12, wherein translating at least part of the visited coefficient includes selecting fewer than all bits of the visited coefficient for output.

38. The method of claim 12, wherein translating at least part of the visited coefficient includes dropping a number of leading zero bits of the visited coefficient indicated by the A-tree leading zero value associated with the parent coefficient and selecting the remaining bits of the visited coefficient for output.

39. The method of claim 12, wherein translating at least part of the visited coefficient includes dropping a number of leading zero bits of the visited coefficient indicated by the A-tree leading zero value associated with the parent coefficient, dropping a predetermined number of low order bits of the visited coefficient, and selecting the remaining bits of the visited coefficient for output.

40. The method of claim 12, wherein the (a) translating, (b) translating and translating at least part of the visited coefficient steps are carried out in the order listed.

41. The method of claim 12, wherein the (a) translating, (b) translating and translating at least part of the visited coefficient steps are carried out in a different order than listed.

42. The method of claim 12, wherein the function of the (a) translating step is a difference of the B-tree leading zero value minus the A-tree leading zero value.

43. The method of claim 12, wherein the function of the (b) translating step is a difference of the A-tree leading zero value minus the B-tree leading zero value.

44. The method of claim 12, wherein the predetermined value is less than zero.

45. The method of claim 12, wherein outputting the translated values includes storing them in a memory location accessible to a subsequent process.

46. The method of claim 12, wherein the predetermined value is zero.

47. The method of claim 46, wherein the memory is a random access memory.

48. The method of claim 46, wherein the memory is a disk memory.

49. A computer-assisted method of populating a data structure including coefficients, parent-child relationships among the coefficients, A-tree leading zeros value, and B-tree leading zeros value, the method including:
   receiving data derived from a subband decomposition of a signal;
   visiting coefficients in the data structure, parent coefficients before child coefficients, parsing one or more substrings from the data corresponding to the visited coefficient, and:
   for a visited coefficient that has a grandparent coefficient, translating a first substring into a function (a) of the A-tree leading zero value and the B-tree leading zero value both associated with a grandparent coefficient of the visited coefficient, calculating a B-tree leading zero value of the grandparent coefficient, and associating the B-tree leading zero value with the grandparent coefficient;
   for a visited coefficient that has a parent coefficient, translating a second substring into a function (b) of the A-tree leading zero value associated with the parent coefficient of the visited coefficient and of the B-tree leading zero value associated with the grandparent coefficient of the visited coefficient, where the B-tree leading zero value associated with the grandparent coefficient is assigned a predetermined value if the visited coefficient does not have any grandparent coefficient, calculating the A-tree leading zero value of the parent coefficient, and associating the A-tree leading zero value with the parent coefficient;
   translating a substring corresponding to the visited coefficient, utilizing the A-tree leading zero value of the parent coefficient, if any, to determine the number of leading zeros of the visited coefficient, and associating the coefficient value with the visited coefficient.

50. The method of claim 49, wherein the data further includes dimensions of the pre-decomposition signal.

51. The method of claim 49, wherein the data further includes dimensions of the pre-decomposition signal and a count of levels of decomposition.

52. The method of claim 49, wherein the data further includes coefficients having different numbers of bits encoded.

53. The method of claim 49, wherein the visited coefficient is represented as a magnitude plus a sign bit.

54. The method of claim 49, wherein the visited coefficient is translated from a complements representation to a magnitude plus a sign bit representation.

55. The method of claim 49, further including decompressing the received data.

56. The method of claim 55, wherein the decompression method is Huffman encoding.

57. The method of claim 55, wherein the decompression method is arithmetic encoding.

58. The method of claim 55, wherein the decompression method is adaptive arithmetic encoding.

59. The method of claim 55, wherein the decompression method is run length encoding.

60. The method of claim 49, wherein the translating into a function (a) and the translating into a function (b) steps use a first translation and the translating utilizing the A-tree leading zero value step uses a second translation.

61. The method of claim 49, wherein translating into a function (a), the translating into a function (b), and the translating utilizing the A-tree leading zero value steps use at least two different translations.

62. The method of claim 49, wherein the translating into a function (a) and the translating into a function (b) steps includes translating a "1"B value to 0, a "01"B value to 1, a "001"B value to 2, and so on.

63. The method of claim 49, wherein the translating into a function (a) step or the translating into a function (b) step utilizes knot encoding.

64. The method of claim 49, wherein the translating into a function (a) step or the translating into a function (b) step utilizes modified knot encoding, wherein a string of zeros having a length equal to a largest value subject to translating is used to represent said largest value.

65. The method of claim 49, wherein the steps are carried out in the order listed.

66. The method of claim 49, wherein the steps are carried out in a different order than listed.

67. The method of claim 49, wherein the function (a) is a difference of the B-tree leading zero value minus the A-tree leading zero value.

68. The method of claim 49, wherein the function (b) is a difference of the A-tree leading zero value minus the B-tree leading zero value.

69. The method of claim 49, wherein the predetermined value is zero.

70. The method of claim 49, wherein the predetermined value is less than zero.

71. A machine readable data structure corresponding to coefficients of a subband decomposition of a signal, including:
  a machine readable memory;
  at least one array, located in the memory, containing coefficients of a subband decomposition, wherein parent-child relationships are defined among the coefficients;
  additional arrays, located in the memory, the additional arrays organized in parallel to one another, including
    an array of pointers to the coefficients, wherein the pointers are organized so that a pointer to a parent coefficient has a lower array index than a pointer to a child coefficient of the parent coefficient;
    an array of integers representing A-tree leading zero values associated with the coefficients;
    an array of integers representing B-tree leading zero values associated with the coefficients;
    an array of multiple flags associated with the coefficients representing
      a sign of a particular coefficient;
      whether the A-zero value of the particular coefficient has been translated for output;
      whether the B-zero value of the particular coefficient has been translated for output; and
    an array of integers representing array indexes of parent coefficients of the coefficients.

72. The data structure of claim 71, further including an array of integers representing the quantized magnitudes of the coefficients.

73. A machine readable data structure corresponding to coefficients of a subband decomposition of a signal, wherein parent-child relationships are defined among the coefficients, including:
  a machine readable memory;
  a plurality of arrays, located in the memory, the arrays organized in parallel, including
    an array of coefficients corresponding to the subband decomposition, wherein the coefficients are organized so that parent coefficients consistently have either higher or lower array indexes than their child coefficients;
    an array of integers representing A-tree leading zero values associated with the coefficients;
    an array of integers representing B-tree leading zero values associated with the coefficients; and
  an array of integers representing array indexes of parent coefficients of the coefficients.

74. The data structure of claim 73, further including an array of integers representing the quantized magnitudes of the coefficients.

75. A machine readable data structure corresponding to coefficients of a subband decomposition of a signal, wherein parent-child relationships are defined among the coefficients, including:
  a machine readable memory;
  a plurality of arrays, located in the memory, the arrays organized in parallel, including
    an array of coefficients corresponding to the subband decomposition,
    wherein the coefficients are organized so that parent coefficients consistently have either higher or lower array indexes than their child coefficients;
    an array of integers representing A-tree leading zero values associated with the coefficients; and
    an array of integers representing B-tree leading zero values associated with the coefficients.

76. The data structure of claim 75, further including an array of integers representing the quantized magnitudes of the coefficients.

* * * * *